No. 855,610. PATENTED JUNE 4, 1907.
E. R. BATHRICK.
SAFETY DEVICE FOR STARTING EXPLOSIVE ENGINES.
APPLICATION FILED SEPT. 8, 1905.
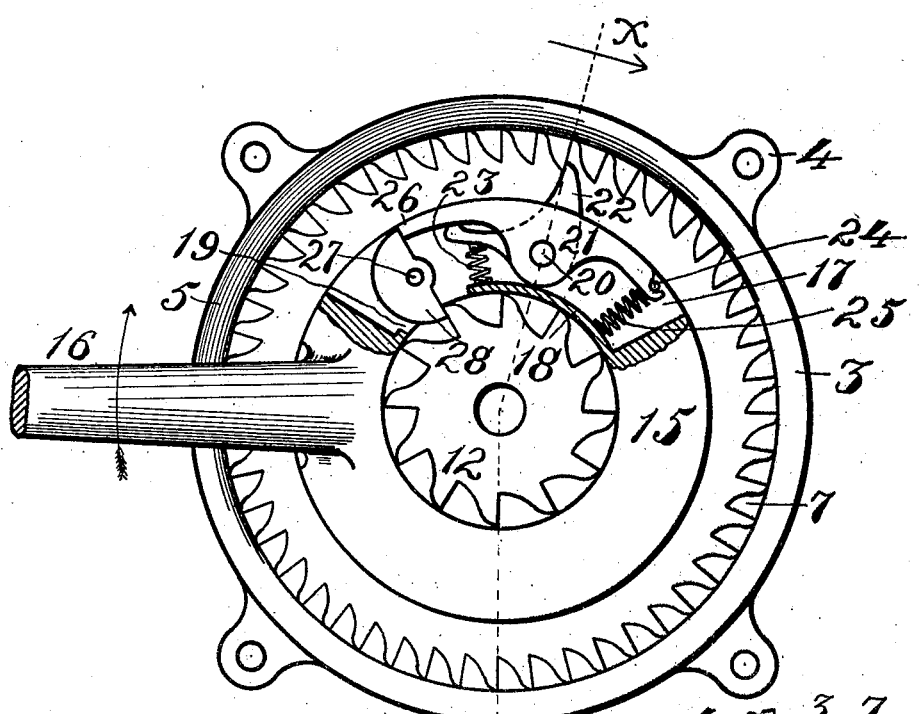
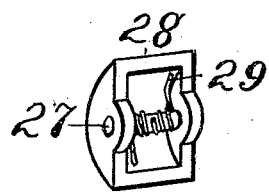
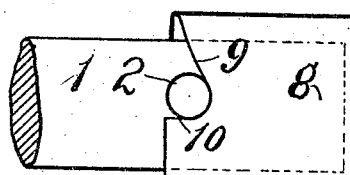
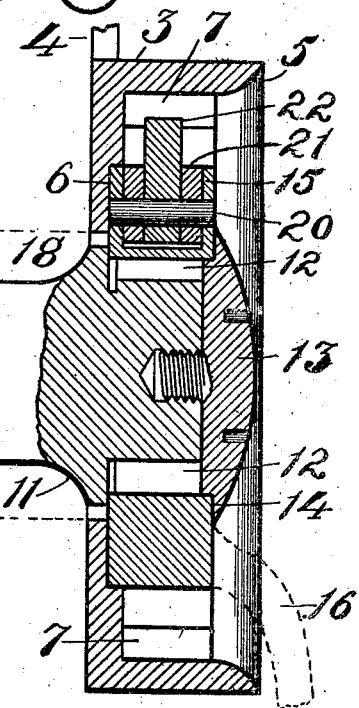
Witnesses:
A. E. Kling
Glenara Foy
Inventor:
E. R. Bathrick,
by C. E. Humphrey
Atty.

UNITED STATES PATENT OFFICE.

ELLSWORTH R. BATHRICK, OF AKRON, OHIO.

SAFETY DEVICE FOR STARTING EXPLOSIVE-ENGINES.

No. 855,610.  Specification of Letters Patent.  Patented June 4, 1907.

Application filed September 8, 1905. Serial No. 277,632.

*To all whom it may concern:*

Be it known that I, ELLSWORTH R. BATHRICK, a citizen of the United States, residing at Akron, in the county of Summit and State of Ohio, have invented new and useful Improvements in Safety Devices for Starting Explosive-Engines, of which the following is a specification.

This invention has relation to improvements in devices for starting explosive engines and is capable of use in connection with either stationary engines or engines used to propel a vehicle or boat.

The object of my invention is to produce a device capable of being attached (with very slight modifications) to the ends of shafts of substantially all of the ordinary explosive engines now on the market, and which will be capable of being used in the ordinary manner as the cranks now in common use, both as a revolving and ratchet crank and also so constructed that upon a sudden "kick back" or "back stroke" of the engine it will not be jerked from the hand of the operator, nor the operator endangered thereby.

The invention further aims to so construct this device that should the crank for any reason remain attached to the end of the shaft of the engine after the same has started and is operating under its own power, it will remain motionless in the hands of the operator and can be readily drawn out from engagement with the shaft of the engine gradually, and will not revolve if locked into positive engagement with the shaft as long as the operator retains his grip on the crank-handle.

The invention further aims to comprise in a compact tool, a universally adaptable device embodying the foregoing advantages, and yet be of a simple, strong and durable construction of such relative cheapness as to find its way into universal use.

With the foregoing and other objects in view, the invention consists of the novel construction, combination and arrangement of parts constituting the device to be hereinafter referred to and illustrated in the accompanying drawings which form a part of this specification in which is shown the preferred embodiment of the invention, but it is to be undertsood that changes, variations and modifications can be resorted to which come within the scope of the claims hereunto appended.

In the drawings, in which similar reference numerals indicate like parts in the different figures: Figure 1 is a front view of my device with certain portions removed to better illustrate the internal construction thereof, and with the end of the crank-arm broken off; Fig. 2 is a section of Fig 1 at the line X; and, Fig. 3 is a detail of a portion of the mechanism employed in the device.

It will be stated in the beginning of the specification of this device that the description hereinafter following will apply particularly to explosive engines used upon automobiles, although the application of this device to stationary and marine explosive engines is entirely within the scope of this invention.

Ordinarily the main engine shaft in automobiles is arranged to project to the front or to one side of the body of the vehicle and to be situated approximately centrally in an opening in the frame thereof which is customarily provided with a metallic thimble to prevent the application of a crank to the end of the shaft from damaging or marring the wood-work or frame of the automobile surrounding this opening.

Describing this device it will be supposed that an opening exists in the side frame of the automobile, and centrally in this opening is the end of an engine shaft 1, provided for the purpose of illustrating this application, with a laterally projecting pin 2 which is adapted to be engaged by the notched socket-head of a crank used for starting the rotation of the shaft of the engine. Attached to the frame of the instrumentality in which the explosive engine is contained and surrounding concentrically the opening in which the engine shaft 1 is disposed, is a cup-shaped element 3 having an opening in the central portion of its floor approximately of equal diameter with the opening in which is situated the end of the engine shaft 1. This cup-shaped element 3 is provided at suitable points with projecting ears 4 suitably perforated to receive bolts or screws by which the element 3 is firmly retained in position. The outer inner edge 5 of this element 3 is rounded to present a pleasing appearance to the eye and also to assist in guiding the placing of the crank-head in position therein. Around the central opening in the bottom floor of the element 3 is an annular rabbet 6 for a purpose be later described. It will be stated that the dimensions and conformation of this rabbet 6 may be made to suit the various requirements of the crank-head which is to revolve therein.

The inner cylindrical portion of the cup-shaped element 3 is provided with inwardly-projecting ratchet-teeth 7 which are each preferably provided (as shown in the drawings) on one side with a flat working face and on the opposite side with a rounded portion. This element 3 as just described is arranged to be permanently attached in position around the opening in which is contained the end of the engine-shaft. The crank proper which is designed preferably to be a detachable device and to have its socket end enter the opening in the frame of the instrumentality in which the engine is contained in order to grasp the end of the engine shaft consists of a socket-head 8 arranged to engage the end of the engine shaft in any manner desired. As shown in the drawings, the inner end of this socket-head 8 is provided with an inclined notch 9 having a rearward square-shoulder 10 which is adapted to engage the pin 2, and when motion is imparted to the socket-head 8 will cause a rotation of the shaft 1, and as soon as the engine is working under its own power and moves forward thereunder the pin will ride along the inclined portion 9 and force outward the socket-head 8 and connecting mechanism so as to detach the same from engagement with the engine shaft.

It will be here stated that the construction shown in Fig. 2 in reference to connecting the head 8 to the engine shaft 1 is only one of a variety of means by which these two may be united temporarily, as many forms of connecting means are employed by various manufacturers to cause the temporary union of the cranks which operate their machines with the engine shafts thereof. It will therefore be apparent that the socket-head 8 of the device will be altered to adapt itself to the peculiar conformation imparted to the end of the engine shaft of each particular maker. The socket-head 8 is provided with an outwardly-flaring enlarged head 11 adjacent to which and outside thereof is formed in this socket-head a series of ratchet-teeth 12 which may be of the same shape as is given to the ratchet-teeth 7 on the element 3. Into the outer end of the socket-head 8 is screwed a large flat-headed nut 13 having a rabbet 14 in the outer portion of its head for a purpose to be stated.

Surrounding the ratchet-teeth 12 and adapted to fit in the rabbet 14 in the head of the nut 13 is a ring 15 which is rigidly secured to a crank-arm 16, on the outer end of which is placed a crank-handle (not shown in the drawings for want of space) but as its form is of the usual type, its illustration in the drawings is deemed to be unnecessary for the complete understanding of this device. This ring 15 is adapted to be revolved by the manipulation of the crank-arm 16 in the direction of the arrow.

In a selected portion of the ring 15 is a circumferentially-arranged pocket 17 in which is contained the mechanism for engaging not only the ratchet-teeth 12 on the socket-head 8, but also the ratchet-teeth 7 in the cup-shaped element 3. This pocket 17 is open at the top or outer portion and is closed at the bottom by a floor 18 through which exists an opening 19 for a purpose to be stated. This pocket 17 is further closed on both of its sides by the material of which the ring 15 is composed, as will be seen by reference to Fig. 2.

Extending approximately centrally and transversely through the pocket 17 is a pin 20 on which is mounted a rocking dog 21 having a slotted central portion in which is placed a pawl 22 arranged to be pivoted on the pin 20 formed in approximately the shape of a bell-crank and having an outwardly-extending leg adapted to engage the ratchet-teeth 7 on the element 3. The opposite leg of the pawl 22 is adapted to engage the under face of the dog 21 and to raise the same whenever the pawl 22 engages the flat working-face of the ratchet-teeth 7. A spring 23 serves to force upward the horizontal-leg of the pawl 22 and keep it close to or in substantial engagement with the under face of the dog 21, excepting when this leg of the pawl 22 is depressed by reason of the engagement of the other leg of the pawl 22 with the rounded faces of the ratchet-teeth 7.

Extending across near the top of the pocket 17 is a bar 24 which serves as a stop, so placed as to encounter one of the ends of the dog 21, which is shaped to properly engage this bar 24 and is held normally in contact therewith by means of a spring 25.

From the description thus far given, it will be seen that owing to the influence of the spring 25 the parts heretofore described will normally remain in the position shown in Fig. 1. The opposite end of the dog 21, hereinafter designated by the reference character 26 is arranged to normally lie substantially concentric and within the normal confines of the exterior periphery of the ring 15 and wholly within the pocket 17.

Extending across the pocket 17 and adjacent to the end 26 of the dog 21 is an irrevoluble pin 27 on which is a semi-circularly-formed hollow pawl 28, the general shape of which is shown in Fig. 3. A spring 29 is connected with the cross-pin 27 and with the pawl 28 in such a manner that the influence of the spring 29 will, under normal conditions maintain the pawl 28 in the position shown in Fig. 1. This pawl 28 is so located that its upper end is arranged to abut against the end 26 of the dog 21 and its lower end is arranged to swing through the opening 19 in the floor 18 of the pocket 17 of the ring 15 and lie in the path of the ratchet-teeth 12 on the socket-head 8. It will be stated that the exterior diameter of the ring 15 is such as to nicely fit and be revolved in the rabbet 6 in the base-portion of the cup-shaped element 3, and this rabbet 6 serves to properly steady the ring 15 when being revolved by means of the crank-arm 16.

It will be noted that the ring 15 is securely held in position between the enlarged flaring-head 11 of the socket-head 8 and the head of the nut 13, so that when removing the ring 15 and placing it in position, using the crank-arm 16 as a handle, the socket-head 8 will be carried thereby and the two when united will constitute the crank-head of the device.

In starting an engine with this device the handle on the arm 16 attached thereto is grasped by the operator and the socket-head 8 connected with the end of the engine shaft 1 and revolved sufficiently in the direction of the arrow in Fig. 1 to cause in this illustration the shoulder 10 to securely engage the pin 2 on the shaft 1.

In placing the device in position as just described, care will be taken to insert the outwardly-extending point of the pawl 22 and the lower end of the pawl 28 respectively between the ratchet-teeth 7 and the ratchet-teeth 12. When the crank-head is properly in place, the parts will be in the position indicated in Fig. 2. After closing the electric circuit to the firing-plug or igniter, the arm 16 is revolved in the direction of the arrow which turns the shaft 1 in a similar direction by mechanism to be described. As soon as the revolution has started, the explosions commence in the cylinder and the engine will then operate under its own power.

In moving the crank-arm 16 in the direction of the arrow, a similar motion of course will take place in the ring 15, and the outer-extended end of the pawl 22 will ride over the rounded ends of the ratchet-teeth 7 and will not engage them, this being permitted by reason of the compression of the spring 23. It will be obvious of course, that the movement of the pawl 22 will not affect the position of the dog 21 which will be in the position shown in Fig. 1, and the pawl 28 will also be in the position shown in this figure with its upper outer end abutting against the end 26 of the dog 21 and its lower end projecting into the opening or bore in the ring 15 in which are the ratchet-teeth 12, and as the ring 15 continues its movement, the lower end of the pawl 28 will engage one of the teeth 12 and cause a simultaneous movement of the entire socket-head 8, which also rotates the shaft 1. As soon as the engine is under sufficient head-way, the operator by a slight upward pull releases the socket-head 8 from engagement with the shaft 1 and withdraws the entire crank-head from its seat in the cup-shaped element 3.

The foregoing description refers to the usual operation where nothing happens. If, however, on the contrary, in attempting to remove the socket-head 8 from connection with the shaft 1 it should stick and thereby have a tendency to jerk the arm 16 away from the grasp of the operator and cause it to revolve in unison with the rapid rotation of the shaft 1, the following operation will take place: If the grasp of the operator upon the handle on the crank-arm 16 is reasonably firm, the rear rounded faces of the ratchet-teeth 12 on the socket-head 8 will encounter the rounded rear edge of the pawl 28 and swing it out from the opening 19, and the rapid passage of the teeth 12 will thereafter serve to maintain it in this position until the operator can either work the entire crank-head free from the shaft or is able to stop the engine. It will be obvious of course, that the encountering of the rounded face of the rear of the pawl 28 will exert such a slight pull upon the ring 15 and arm 16 that only a very slight restraint upon the part of the operator is needed to keep the crank-arm stationary.

As soon as the operator shall have removed the crank-head after the foregoing operation, the pawl will return to the position indicated in Fig. 1, by reason of the spring 29 contained therein.

If for any reason in starting an explosive engine, it kicks back or reverses its stroke suddenly, as they sometimes will do, the tendency of the teeth 12 on the socket-head 8 will be to engage the pawl 28 and force the ring 15 and crank-arm 16 in a direction reverse to the arrow. As soon as this starts, the outer extended leg of the pawl 22 will engage the working-face of one of the ratchet-teeth 7 and this engagement will cause the opposite leg of the pawl 22 to kick outward and throw the end 26 of the dog 21 outwardly from engagement with the pawl 28, allowing the ratchet-teeth 12 to push the pawl from the opening 19 and out of their path. It will be obvious therefore, that the only distance which a "kickback" on the part of the engine would cause to the crank-arm 16 will be the distance traversed before the outer extended leg of the pawl 22 will move before encountering one of the working-faces of the ratchet-teeth 7, and as these ratchet-teeth are relatively very close together, this distance will be very slight. It will be further apparent, that instead of revolving the crank-arm continuously in a circle to start an engine, it may be worked as a ratchet-crank by working the arm 16 backward, allowing the pawl 28 to pass over a selected number of teeth 12 and to then engage one, and the reverse motion of the arm will cause a simultaneous movement of the socket-head 8 and shaft 1, the pawl in this illustration being used as an ordinary one on ordinarily ratchet-teeth.

Having thus described my invention, what

I claim and desire to secure by Letters Patent, is:—

1. A device for imparting an initial start to explosive engines, comprising means for attaching said device to a suitable part of an engine, said attaching means being provided with ratchet-teeth, a crank-arm provided with an annularly-formed head arranged to surround said attaching means adjacent said ratchet-teeth, a pawl carried by said annular head arranged to engage said ratchet-teeth, means to lock said pawl whereby said pawl will operatively engage said ratchet-teeth when operated in one direction and inoperatively engage said teeth when the motion thereof is reversed, and means to release said means from engagement with said pawl when a reverse motion is imparted to said connecting means.

2. A device for imparting an initial start to explosive engines, comprising means for connecting said device to a suitable part of an engine, said connecting means being provided with ratchet-teeth, a crank-arm provided with an annularly-formed head to encircle the ratchet-teeth of said connecting means, a pawl carried by said annularly-formed head, said pawl being arranged to operatively engage said ratchet-teeth when said annularly-formed head is revolved in one direction and to inoperatively engage said ratchet-teeth when the motion thereof is reversed, a locking dog arranged to engage said pawl, a second pawl adapted to release said dog from engagement with said first pawl, and means to cause the operation of said second pawl when the motion of said annularly-formed head is reversed.

3. In a device for imparting an initial start to explosive engines, comprising means for connecting said device with a suitable part of an engine, said connecting means being provided with ratchet teeth, an annularly-formed crank-head adapted to surround the ratchet-teeth on said connecting means, a pawl carried by said crank-head arranged to engage said ratchet-teeth, a dog to lock said pawl whereby a positive engagement is afforded between said crank-head and said ratchet-teeth, a second pawl arranged to trip said dog and release said first pawl when the motion of said crank-head is reversed, an inclosing element to surround said crank-head provided with ratchet-teeth on its inner portion arranged to operatively engage said second pawl when the motion of said crank-head is reversed.

4. A device for imparting an initial start to explosive engines, comprising means for attaching said device to a suitable part of an engine, said connecting means being provided with ratchet-teeth, an annularly-formed crank-head arranged to inclose the ratchet-teeth on said connecting means, a pawl carried by said annularly-formed crank-head to operatively engage said ratchet-teeth, means to normally hold said pawl in a position to engage said ratchet-teeth, a dog to lock said pawl in position, means to keep said dog in a position to engage said pawl, a second pawl adapted to trip said dog and release the same from engagement with said first pawl, and a plurality of encircling ratchet-teeth arranged to operatively engage said second pawl when the motion of said crank-head is reversed whereby said dog is released from engagement with said first pawl, and said first pawl released from operative engagement with the ratchet-teeth on said connecting means.

5. A device for imparting an initial start to explosive engines, comprising means for connecting said device with a suitable part of an engine, an annularly-formed crank-head arranged to encircle said connecting means, means carried by said crank-head to operatively engage said connecting means when said crank-head is operated in one direction, and to be inoperative when the motion thereof is reversed, and means to release said engaging means upon a reversal of the motion of said crank-head.

6. A device for imparting an initial start to explosive engines, comprising means for connecting said device with a suitable part of an engine, said connecting means being provided with ratchet-teeth, an annularly-formed crank-head adapted to encircle said ratchet-teeth, a pivoted pawl carried by said crank-head with its lower end in a position to operatively engage said ratchet-teeth, means to maintain said pawl normally in a position to engage said ratchet-teeth, a dog to engage the upper end of said pawl, means to limit the motion of said dog, a second pawl adapted to engage and release said dog from engagement with said first pawl, and a plurality of encircling ratchet-teeth arranged to operatively engage said second pawl when the motion of said crank-head is reversed.

In testimony whereof I have hereunto set my hand in presence of two subscribing witnesses.

ELLSWORTH R. BATHRICK.

Witnesses:
C. E. HUMPHREY,
GLENARA FOX.